United States Patent
Shi et al.

(10) Patent No.: US 12,324,020 B2
(45) Date of Patent: Jun. 3, 2025

(54) METHOD AND APPARATUS FOR DATA TRANSMISSION

(71) Applicant: LENOVO (BEIJING) LIMITED, Beijing (CN)

(72) Inventors: Jie Shi, Beijing (CN); Lianhai Wu, Beijing (CN); Haiming Wang, Beijing (CN); Zhi Yan, Beijing (CN); Jing Han, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 318 days.

(21) Appl. No.: 17/628,331

(22) PCT Filed: Jul. 19, 2019

(86) PCT No.: PCT/CN2019/096898
§ 371 (c)(1),
(2) Date: Jan. 19, 2022

(87) PCT Pub. No.: WO2021/012119
PCT Pub. Date: Jan. 28, 2021

(65) Prior Publication Data
US 2022/0287101 A1 Sep. 8, 2022

(51) Int. Cl.
*H04W 74/08* (2024.01)
*H04W 68/00* (2009.01)
*H04W 74/0833* (2024.01)

(52) U.S. Cl.
CPC ..... *H04W 74/0833* (2013.01); *H04W 68/005* (2013.01)

(58) Field of Classification Search
CPC . H04W 68/005; H04W 68/02; H04W 74/006; H04W 74/0833; H04W 74/0836;
(Continued)

(56) References Cited

U.S. PATENT DOCUMENTS 10,448,359 B2 * 10/2019 Hu .............. H04W 68/02
10,512,057 B1 * 12/2019 Maheshwari ......... H04W 16/32
(Continued)

FOREIGN PATENT DOCUMENTS

WO  WO-2016148452 A1 * 9/2016 ............ H04W 16/26
WO     2019032222 A1    2/2019

OTHER PUBLICATIONS

Shrestha et al. U.S. Appl. No. 62/862,528, filed Jun. 17, 2019 (Year: 2019).*
(Continued)

*Primary Examiner* — Wutchung Chu
(74) *Attorney, Agent, or Firm* — Kunzler Bean & Adamson

(57) ABSTRACT

The present application relates to a user equipment, a base station and a method for data transmission. The base station transmits a paging message to the user equipment. The paging message includes a Random Access Channel (RACH) resource associated with Coverage Enhancement (CE) level information. After receiving the paging message, the user equipment selects a specific CE level from the CE level information. The user equipment transmits a Random Access (RA) preamble to the base station according to the RACH resource with the specific CE level.

20 Claims, 14 Drawing Sheets

(58) Field of Classification Search
CPC ... H04W 74/0838; H04W 4/70; H04W 24/02; H04W 74/08; H04W 74/0866; H04W 74/002; H04W 74/008; H04W 72/21; H04W 72/02; H04W 74/004; H04W 74/02

See application file for complete search history.

(56) References Cited

U.S. PATENT DOCUMENTS

| | | | | |
|---|---|---|---|---|
| 10,555,346 | B2* | 2/2020 | Wang | H04W 74/0833 |
| 2016/0353440 | A1 | 12/2016 | Lee et al. | |
| 2017/0099682 | A1* | 4/2017 | Priyanto | H04W 74/0833 |
| 2017/0280481 | A1* | 9/2017 | Stern-Berkowitz | H04L 1/1854 |
| 2017/0290063 | A1* | 10/2017 | Ye | H04W 74/0833 |
| 2017/0359801 | A1* | 12/2017 | Chen | H04W 4/12 |
| 2017/0374570 | A1* | 12/2017 | Yi | H04L 1/00 |
| 2018/0069593 | A1* | 3/2018 | Yi | H04L 5/003 |
| 2018/0176847 | A1* | 6/2018 | Fasil Abdul | H04W 76/10 |
| 2018/0192354 | A1* | 7/2018 | Yi | H04W 72/23 |
| 2018/0242306 | A1* | 8/2018 | Wong | H04W 76/10 |
| 2018/0279268 | A1* | 9/2018 | You | H04L 5/0035 |
| 2018/0376508 | A1* | 12/2018 | Höglund | H04W 74/0833 |
| 2019/0208411 | A1 | 7/2019 | Shrestha et al. | |
| 2021/0204192 | A1* | 7/2021 | Lee | H04L 67/62 |
| 2022/0167438 | A1* | 5/2022 | Shrestha | H04W 68/005 |
| 2023/0188261 | A1* | 6/2023 | Awadin | H04L 1/08 370/329 |

OTHER PUBLICATIONS

International Searching Authority, "Written Opinion of the International Searching Authority," PCT/CN2019/096898, Apr. 14, 2020, pp. 1-4.

Alcatel-Lucent et al., Coverage enhancement for RACH messages, 3GPP TSG-RAN WG1 Meeting #76, R1-140153, Feb. 10-14, 2014, pp. 1-5, Prague, Czech Republic.

* cited by examiner

METHOD AND APPARATUS FOR DATA TRANSMISSION

TECHNICAL FIELD

The present disclosure generally relates to data transmission, and relates more particularly to data transmission in a random access response, which is in response to a random access preamble, of Early Data Transmission.

BACKGROUND OF THE INVENTION

For improving efficiency of data transmission, techniques of Early Data Transmission (EDT) are introduced for some networks, e.g., Narrow Band-Internet of Things (NB-IoT), enhanced Machine Type Communication (eMTC), etc. EDT includes Mobile Originating EDT (MO-EDT) and Mobile Terminated EDT (MT-EDT).

According to protocol of EDT, a user equipment transmits a preamble to a base station for accessing network. In response to the preamble, the base station transmits a response to the user equipment. Some downlink data from the base station to the user equipment can be transmitted with the response. However, specific details on each signaling of EDT procedure have not been discussed yet and there are still some issues that need to be solved.

BRIEF SUMMARY OF THE INVENTION

One embodiment of the present disclosure provides a method of a user equipment. The method includes: receiving a paging message from a base station, wherein the paging message comprises a Random Access Channel (RACH) resource associated with at least one Coverage Enhancement (CE) level information; selecting a specific CE level from the at least one CE level information; and transmitting a Random Access (RA) preamble to the base station according to the RACH resource with the specific CE level.

In some embodiments, in the paging message, there may be multiple RACH resources associated with two or more CE level information. Each RACH resource may be associated to one CE level.

Another embodiment of the present disclosure provides a method of a user equipment. The method includes: receiving an information request from a base station, wherein the information request comprises a RACH information request; and transmitting an indication to the base station in response to the RACH information request, wherein the indication indicates that the user equipment accesses the base station over one or multiple RACH resources.

Another embodiment of the present disclosure provides a method of a base station. The method includes: transmitting a paging message to a user equipment, wherein the paging message comprises a RACH resource associated with at least one Coverage Enhancement (CE) level information for the user equipment to select a specific CE level from the at least one CE levels information; and receiving an RA preamble from the user equipment according to the RACH resource with the specific CE level.

Another embodiment of the present disclosure provides a method of a base station. The method includes: transmitting an information request to a user equipment, wherein the information request comprises a RACH information request; and receiving an indication from the user equipment in response to the RACH information request, wherein the indication indicates that the user equipment accesses the base station over multiple RACH resources.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION OF THE INVENTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
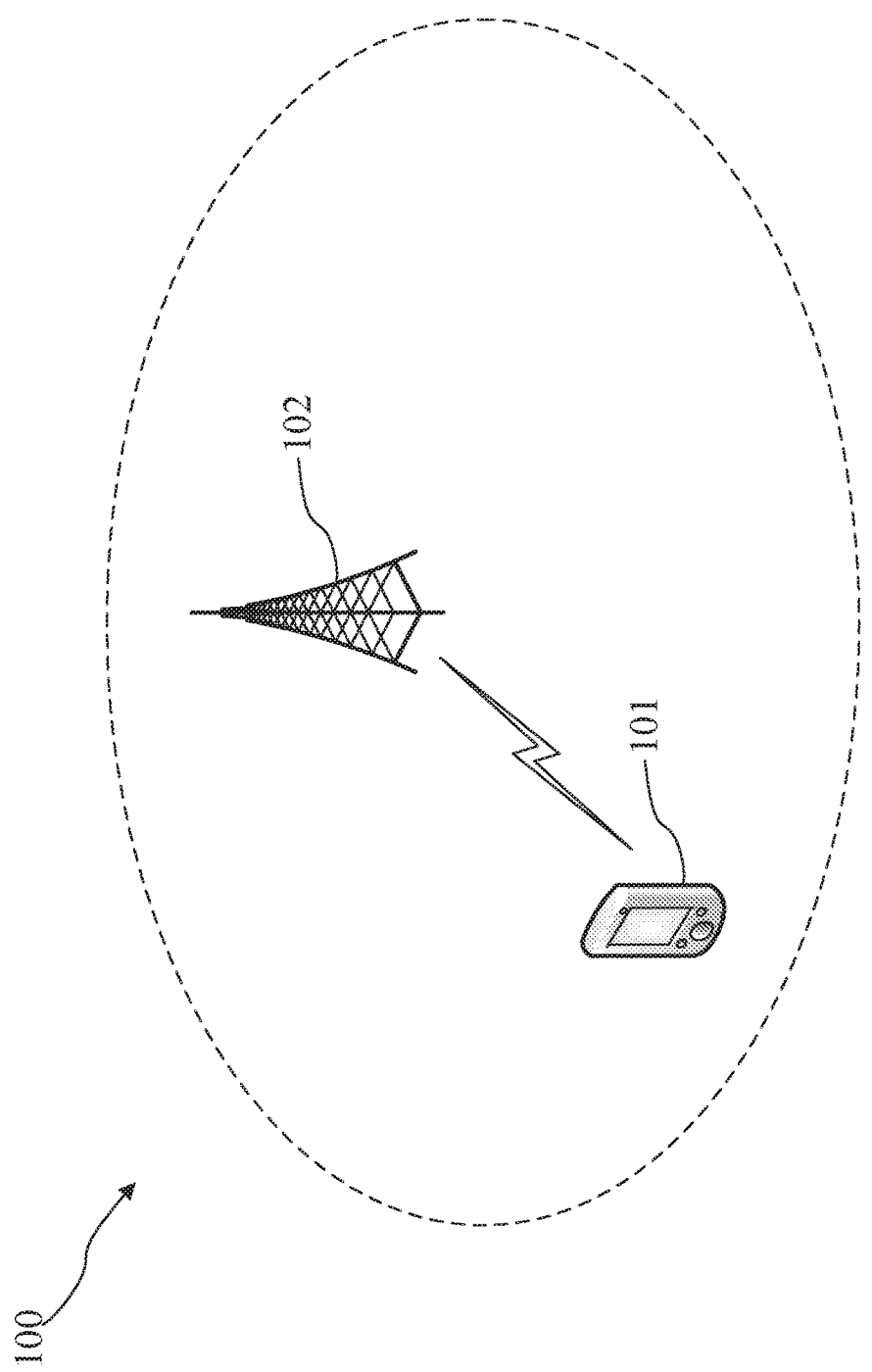
FIG. 1 illustrates a wireless communication system according to an embodiment of the present disclosure.

Referring to FIG. 1, a wireless communication system 100 may include a user equipment (UE) 101 and a base station (BS) 102. Although a specific number of UE 101 and BS 102 are depicted in FIG. 1, it is contemplated that any number of UEs 101 and BSs 102 may be included in the wireless communication system 100.

BS 102, which may communicate with a core network (CN) 103, may operate or work under the control of a Mobility Management Entity (MME) (not illustrated in FIG. 1). CN 103 may include a Home Subscriber Server (IISS) (not illustrated in FIG. 1), which communicatively coupled with the MME. In certain embodiments of the present application, BS 102 may also be referred to as an access point, an access terminal, a base, a base unit, a macro cell, a Node-B, an evolved Node B (eNB), a gNB, a Home Node-B, a relay node, or a device, or described using other terminology used in the art. BS 102 is generally part of a radio access network that may include one or more controllers communicably coupled to one or more corresponding BS(s) 102.

UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems). Internet of Thing (IoT) devices, or the like.

According to some embodiments of the present application, UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, UE 101 may include, for example, but is not limited to, wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. UE 101 may communicate directly with BSs 102 via uplink communication signals.

BS 102 may be distributed over a geographic region. In certain embodiments of the present application. BS 102 may also be referred to as an access point, an access terminal, a base, a base unit, a macro cell, a Node-B, an evolved Node B (eNB), a gNB, a Home Node-B, a relay node, or a device, or described using other terminology used in the art. BS 102 is generally part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and UE 101 transmit data on the UL using a single-carrier frequency division multiple access (SC-FDMA) or OFDM scheme. More generally, however, the wireless communication system 100 may implement some other open or proprietary communication protocols, for example. WiMAX, among other protocols.

In some embodiments of the present application, BS 102 may communicate using other communication protocols, such as the IEEE 802.11 family of wireless communication protocols. Further, in some embodiments of the present application, BS 102 may communicate over licensed spectrums, whereas in other embodiments BS 102 may communicate over unlicensed spectrums. The present application is not intended to be limited to the implementation of any particular wireless communication system architecture or protocol. In yet some embodiments of present application. BS 102 may communicate with UE 101 using the 3GPP 5G protocols.

According to some existing agreements for Mobile Terminated Early Data Transmission (MT-EDT), UE 101 transmits a Random Access (RA) preamble (i.e., Message 1 of MT-EDT) to BS 102 according to dedicated Random Access Channel (RACH) resource used for a contention-free RACH procedure. Then BS 102 transmits some downlink data to UE 101 by an RA response (i.e., Message 2 of MT-EDT) in response to the RA preamble. An MT-EDT procedure that includes operation of transmitting downlink data by Message 2 may be referred to as an Msg.2 based MT-EDT procedure. However, specific details on each signaling of the Msg.2 based MT-EDT procedure have not been discussed yet and there are still some issues that need to be solved.

Figure 2A:
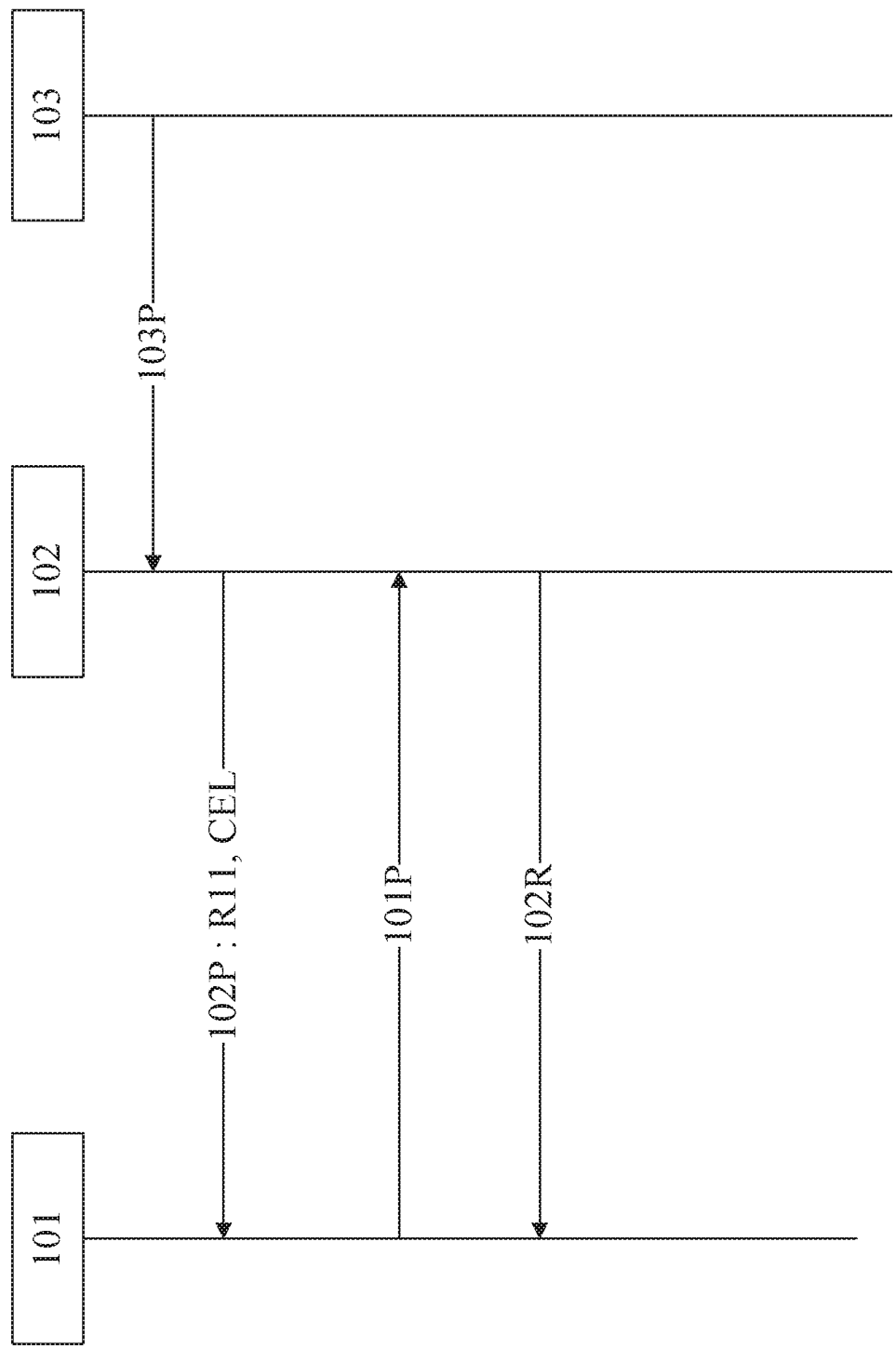
FIGS. 2A to 2D are schematic views of message transmission among a wireless communication system according to an embodiment of the present disclosure.

Referring to FIG. 2A, when CN 103 needs to initialize an Msg.2 based MT-EDT procedure with UE 101 via BS 102, CN 103 may transmit a paging message 103P to BS 102 first. After receiving the paging message 103P from CN 103, BS 102 may determine a RACH resource R11 for UE 101. In some embodiments, the RACH resource R11 may be dedicated to UE 101. In other words, the RACH resource R11 may be a contention-free resource for UE 101 to utilize.

Then, BS 102 may transmit a paging message 102P including the RACH resource R11 to UE 101 for notifying UE 101 of the Msg.2 based MT-EDT procedure initialized by CN 103. For UE 101 to correctly receive downlink data in Message 2 of MT-EDT from BS 102, some information for UE 101 to utilize may be transmitted with the RACH resource R11 in the paging message 102P.

In some embodiments, because UE 101 may perform RA procedure with BS 102 under a certain Coverage Enhancement (CE) level, information of CE level may be transmitted with the RACH resource R11 in the paging message 102P.

In particular, according to CE technique, multiple CE levels may be configured for UE 101 and BS 102 to deal with different radio conditions. In some implementations, there may be up to "N" number of CE levels, which are CE level "0" to CE level "N−1", configured for UE 101 and BS 102. CE level "0" may correspond to the normal radio condition between UE 101 and BS 102, and CE level "N−1" may correspond to the worst radio condition between UE 101 and BS 102.

More specifically, in some implementations, CE level "0" may correspond to a CE level "0" threshold. When a Reference Signal Receiving Power (RSRP) value, which is measured by UE 101, between UE 101 and BS 102 is less than CE level "0" threshold, UE 101 may operate under CE level "0" with BS 102. In some implementations. CE level "N−1" may correspond to a CE level "N−1" threshold. When a RSRP value, which is measured by UE 101, between UE 101 and BS 102 is less than CE level "N−1" threshold and greater than CE level "N−2" threshold. UE 101 may operate under CE level "N−1" with BS 102.

To improve the probabilities of successful RA procedure between UE 101 and BS 102, different CE levels may be configured with different message repetition number. For instance, UE 101 and BS 102 operating with CE level "0" (which means that the radio condition between UE 101 and BS 102 is normal) may be configured with a lower message repetition number. UE 101 and BS 102 operating with CE level "N−1" (which means that the radio condition between UE 101 and BS 102 is very poor) may be configured with a higher message repetition number.

Accordingly, in some embodiments, in addition to the RACH resource R11, the paging message 102P may further include CE level information CEL. The RACH resource R11 may be associated with the CE level information CEL in the paging message 102P. For instance, in the paging message 102P, there may be an instruction indicating that the RACH resource R11 corresponds to the CE level information CEL. Therefore, after receiving the paging message 102P. UE 101 may select a specific CE level (not shown) from the CE level information CEL. Then, UE 101 may operate under the specific CE level and transmit an RA preamble 101P to BS 102 according to the RACH resource R11.

More specifically, in some embodiments, in addition to the RACH resource R11, the paging message 102P may further include the CE level information CEL having of multiple CE levels. The RACH resource R11 may be associated with one of the multiple CE levels in the paging message 102P. For instance, in the paging message 102P, there may be instruction indicating that the RACH resource R11 corresponds to one the multiple CE levels.

In some embodiments, the multiple CE levels may include a CE level "A", a CE level "B" and a CE level "C". CE level "A" may be the same as a previous CE level of UE 101 stored in the MME of CN 103 or stored in BS 102. CE level "B" may be a CE level higher than CE level "A" or may be the highest CE level. CE level "C" may be a CE level lower than CE level "A" or may be the lowest CE level. Therefore, after receiving the paging message 102P, UE 101 may select the specific CE level from CE level "A". CE level "B" and CE level "C".

In some embodiments, when one of CE level "A", CE level "B" and CE level "C" is the same as a CE level currently used by UE 101, UE 101 may select this CE level as the specific CE level. In some embodiments, when CE level "A", CE level "B" and CE level "C" are all different from the CE level currently used by UE 101, UE 101 may select one CE level, which is higher than the CE level currently used by UE 101, from CE level "A". CE level "B" and CE level "C" as the specific CE level. After selecting the specific CE level. UE 101 may operate under the specific CE level and transmit the RA preamble 101P to BS 102 according to the RACH resource R11.

For example, as to Narrow Band-Internet of Things (NB-IoT) network, four CE levels, which are CE levels "0" to "3", are supported. CE level "0" is the lowest CE level and CE level "3" is the highest CE level. When the previous CE level of UE 101 stored in the MME or stored in BS 102 is CE level "2", the CE level information CEL includes three CE levels, which are CE level "2" (i.e., the CE level the same as the previous CE level of UE 101 stored in the MME or stored in BS 102). CE level "3" (i.e., the CE level higher than CE level "2") and CE level "1" (i.e., the CE level lower than CE level "2") in the paging message 102P.

Accordingly, after receiving the paging message 102P, UE 101 selects the specific CE level from CE levels "1", "2" and "3". When the CE level currently used by UE 101 is CE level "1" (which is indicated in the paging message 102P as well). UE 101 selects CE level "1" as the specific CE level. Similarly, when the CE level currently used by UE 101 is CE level "2" (which is indicated in the paging message 102P as well). UE 101 selects CE level "2" as the specific CE level. When the CE level currently used by UE 101 is CE level "0" (which is not indicated in the paging message 102P), UE 101 selects CE level "1", which is higher than and closest to the CE level currently used by UE 101, as the specific CE level. After selecting the specific CE level, UE 101 may operate under the specific CE level and transmit the RA preamble 101P to BS 102 according to the RACH resource R11 which is associated with the specific CE level.

In some embodiments, the multiple CE levels may include a CE level "X" and a CE level "Y". CE level "X" may be the same as the previous CE level of UE 101 stored in the MME of CN 103 or stored in BS 102. CE level "Y" may be a highest CE level. Therefore, after receiving the paging message 102P. UE 101 may select the specific CE level from CE level "X" and CE level "Y".

In some embodiments, when one of CE level "X" and CE level "Y" is the same as a CE level currently used by UE 101. UE 101 may select this CE level as the specific CE level. In some embodiments, when CE level "X" and CE level "Y" are all different from the CE level currently used by UE 101, UE 101 may select CE level "Y", which is the highest CE level, as the specific CE level. After selecting the specific CE level, UE 101 may operate under the specific CE level and transmit the RA preamble 101P to BS 102 according to the RACH resource R11.

For example, as to Machine Type Communication (MTC) network, three CE levels, which are CE levels "0" to "2", are support. CE level "0" is the lowest CE level and CE level "2" is the highest CE level. When the previous CE level of UE 101 stored in the MME or store in BS 102 is CE level "0", the CE level information CEL includes two CE levels, which are CE level "0" (i.e., the CE level the same as the previous CE level of UE 101 stored in the MME) and CE level "2" (i.e., the highest CE level) in the paging message 102P.

Accordingly, after receiving the paging message 102P, UE 101 selects the specific CE level from CE levels "0" and "2". When the CE level currently used by UE 101 is CE level "0" (which is indicated in the paging message 102P as well), UE 101 selects CE level "0" as the specific CE level. When the CE level currently used by UE 101 is CE level "1" (which is not indicated in the paging message 102P). UE 101 selects CE level "2", which is the highest CE level, as the specific CE level.

It should be noted that, according to the mentioned CE technique, different CE levels may be configured with different RA preamble repetition number. In particular, in some embodiments, RA preamble repetition number may be a maximum number of RA preamble attempt. In some embodiments, RA preamble repetition number may be a repetition number per RA preamble attempt. Lower CE level may be configured with a lower RA preamble repetition number. Higher CE level may be configured with a higher RA preamble repetition number.

More specifically, the highest CE level means the CE level with highest number, where the measurement threshold for used in the highest CE level is the lowest. The similar concept may be used to other CE level. The higher CE level means the CE level with higher level number, where the measurement threshold for used in this CE level is lower.

Accordingly, in some embodiments, the CE level information CEL may be defined by RA preamble repetition number. In detail, in addition to the RACH resource R11, the paging message 102P may further include at least one RA preamble repetition number (not shown). UE 101 and BS 102 may be pre-configured as that at least one CE level in the CE level information CEL is defined by the at least one RA preamble repetition number.

For instance, UE 101 may be pre-configured as that CE level "G" is defined by RA preamble repetition number "g" and CE level "H" is defined by RA preamble repetition number "h". Accordingly, when the CE level information CEL in the paging message 102P includes RA preamble repetition numbers "g" and "h", UE 101 may conclude that CE levels "G" and "H" are supported by the paging message 102P. Then. UE 101 may select one of CE level "G" and CE level "H" as the specific CE level. In some embodiments, the at least one RA preamble repetition number may be included in a System Information Block (SIB) broadcasted from BS 102 to UE 101.

In some embodiments, the paging message 102P may include at least one RA response repetition number (not shown) which correspond to the CE level information CEL. For example, when the paging message 102P include CE level "A" and CE level "B", the paging message 102P further include RA response repetition number "a" corresponding to CE level "A" and RA response repetition number "b" corresponding to CE level "B". Accordingly, when UE 101 selects CE level "B" as the specific CE level and transmits the RA preamble 101P to BS 102 under CE level "B", BS 102 is notified of CE level "B" selected by UE 101. Then, in response to the RA preamble 101P, BS 102 can transmit an RA response 102R according to RA responses repetition number "b" corresponding to CE level "B".

In some embodiments, the paging message 102P may include an RA response repetition number (not shown) which corresponds to the RACH resource R11. For example, as to the RACH resource R11, there is a corresponding RA response repetition number "i" in the paging message 102P. Accordingly, when BS 102 receives the RA preamble 101P from UE 101 according to the RACH resource R11, BS 102 can transmit the RA response 102R according to RA responses repetition number "i" corresponding to the RACH resource R11.

In some embodiments, the RACH resource R11 may be selected from a resource pool. The resource pool may be used for UE 101 to initialize RA procedure by sending RA preamble in the RACH R11 resource and receiving downlink data in an RA response from BS 102. Further, the resource pool may configure RACH preamble index information, time domain information for preamble of RA procedure and frequency domain information for preamble of RA procedure.

In particular, BS 102 may determine a RACH resource pool (not shown), which includes a plurality of RACH resources, for Msg.2 based MT-EDT procedure. Then, BS 102 may notify UE 101 of the RACH pool by broadcasting a SIB. In addition, the RACH resource pool may be associated with a dedicated CE level.

More specifically, in the RACH resource pool, each RACH resource may correspond to the dedicated CE level. Therefore, when the RACH resource R11 is selected from the RACH resource pool by BS 102, there may be instruction indicating that the RACH resource R11 corresponds to the dedicated CE level in the paging message 102P.

Accordingly, after receiving the paging message 102P, UE 101 may be notified of Msg.2 based MT-EDT procedure according to the RACH resource R11 which is selected from the RACH resource pool. Further, UE 101 may select the dedicated CE level, which corresponds to the RACH resource R11, as the specific CE level. Then, UE 101 may operate under the specific CE level and transmit the RA preamble 101P to BS 102 according to the RACH resource R11. In some embodiments, the dedicated CE level may be the highest CE level so that UE 101 may select the highest CE level as the specific CE level.

In some embodiments, after receiving the paging message 102P with the RACH resource R11 selected from the RACH resource pool, UE 101 may determine a carrier and a subcarrier for transmitting the RA preamble 101P. As for the subcarrier, the paging message 102P may include a dedicated subcarrier index (not shown). UE 101 may select a subcarrier (not shown) according to the dedicated subcarrier index. For example, when the dedicated subcarrier index is number "10". UE 101 selects $10^{th}$ subcarrier from a set of subcarriers and transmits the RA preamble 101P by $10^{th}$ subcarrier.

In some embodiments. UE 101 may determine the subcarrier index according to a formula. In detail. UE 101 may calculate the subcarrier index according to the following formula:

$$SI=(\text{ra-PreambleIndex})\text{modulo}(\text{nprach-NumSubcarriersForMsg2})$$

where SI represents the subcarrier index, ra-PreambleIndex represents a configured number and nprach-NumSubcarriersForMsg2 represents a subcarrier number for transmitting the RA preamble 101P. After calculating the subcarrier index, UE 101 may determine the subcarrier according to the subcarrier index and transmit the RA preamble 101P by the subcarrier. In some embodiments, the parameters of ra-PreambleIndex may be transmitted in the paging message 102P or in a SIB from BS 102, and nprach-NumSubcarriersForMsg2 may be transmitted in the paging message 102P or in a SIB from BS 102.

Figure 2B:
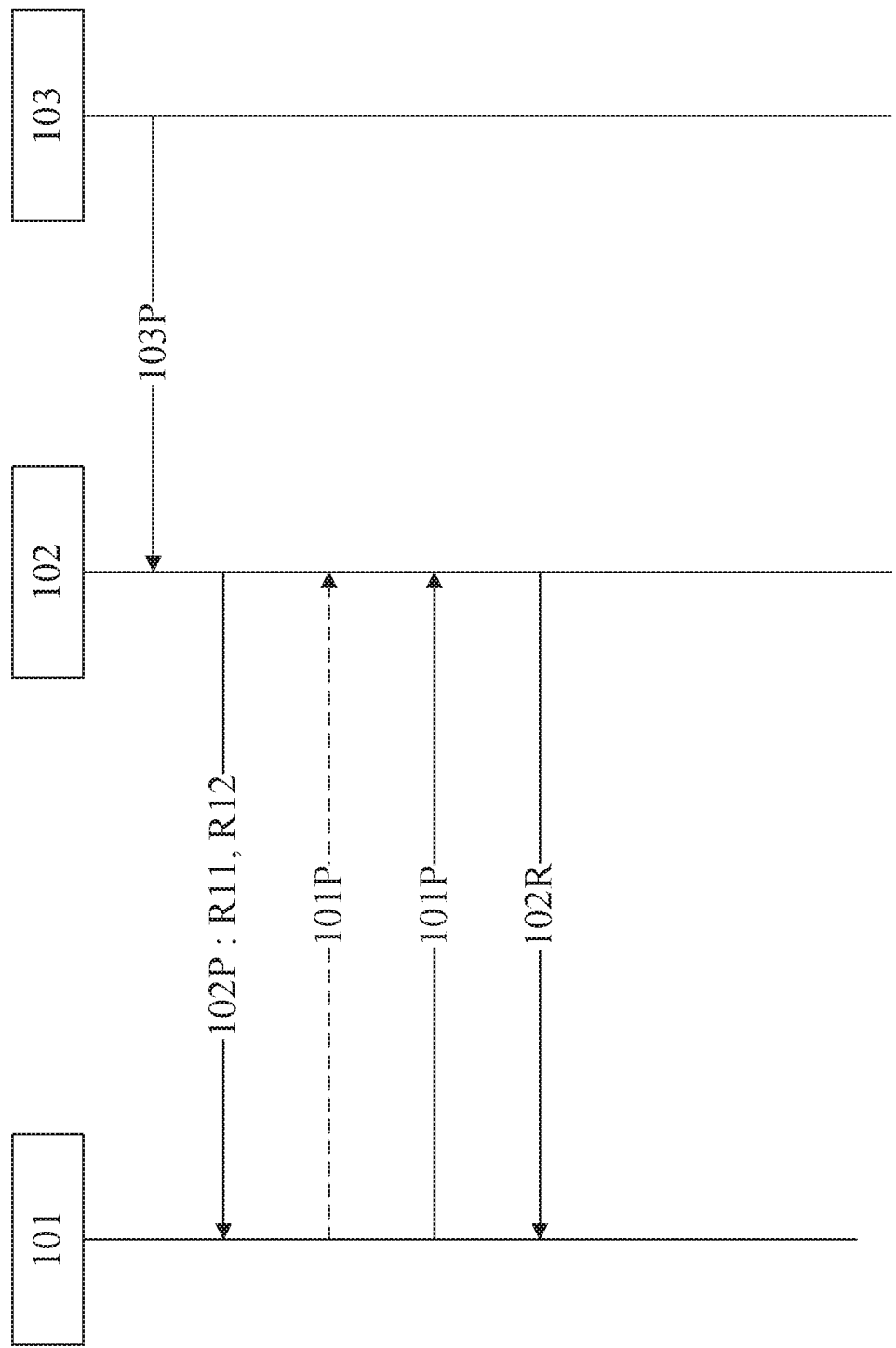

Referring to FIG. 2B, in some embodiments, the paging message 102P may include the RACH resource R11 and a RACH resource R12. The RACH resource R11 may be selected from the RACH resource pool associated with a dedicated CE level. The RACH resource R12 may be associated with the previous CE level of UE 101 stored in the MME of CN 103 or stored in BS 102.

In some implementations, after receiving the paging message 102P. UE 101 may, according to the RACH resource R12, operate under the previous CE level of UE 101 stored in the MME or BS 102 and transmit the RA preamble 101P to BS 102 for accessing BS 102. When UE 101 fails to access BS 101 (i.e., fail to transmit RA preamble 101P to BS 102 as the dot line in FIG. 2B) according to the RACH resource R12 under the previous CE level of UE 101 stored in the MME or BS 102. UE 101 may, according to the RACH resource R11, changes to operate under the dedicated CE level and transmit the RA preamble 101P of to BS 102 for accessing BS 102.

It should be noted that the previous CE level stored in the MME or BS 102 may be the last CE level that UE 101 used to communicate with BS 102 and CN 103. In some embodiments, the previous CE level stored in the MME or BS 102 may be the last CE level that UE 101 communicates with BS 102 under a Radio Resource Control (RRC) connected status.

In some embodiments, for updating the previous CE level stored in the MME or BS 102 by the latest CE level currently used by UE 101, UE 10 may report its CE level. In some implementations, when UE 101 changes from CE level "a" to CE level "b", UE 101 may transmit information of CE level "b" to BS 102 for updating the previous CE level stored in the MME or BS 102 in time. In some implementations, there may be a timer configured in UE 101. When the timer expires, UE 101 may transmit current CE level to BS 102 for updating the previous CE level stored in the MME or BS 102 in time. In some implementations, when UE 101 changes from CE level "x" to CE level "y" and the timer expires, UE 101 may transmit information of CE level "y" to BS 102 for updating the previous CE level stored in the MME or BS 102 in time.

Figure 2C:
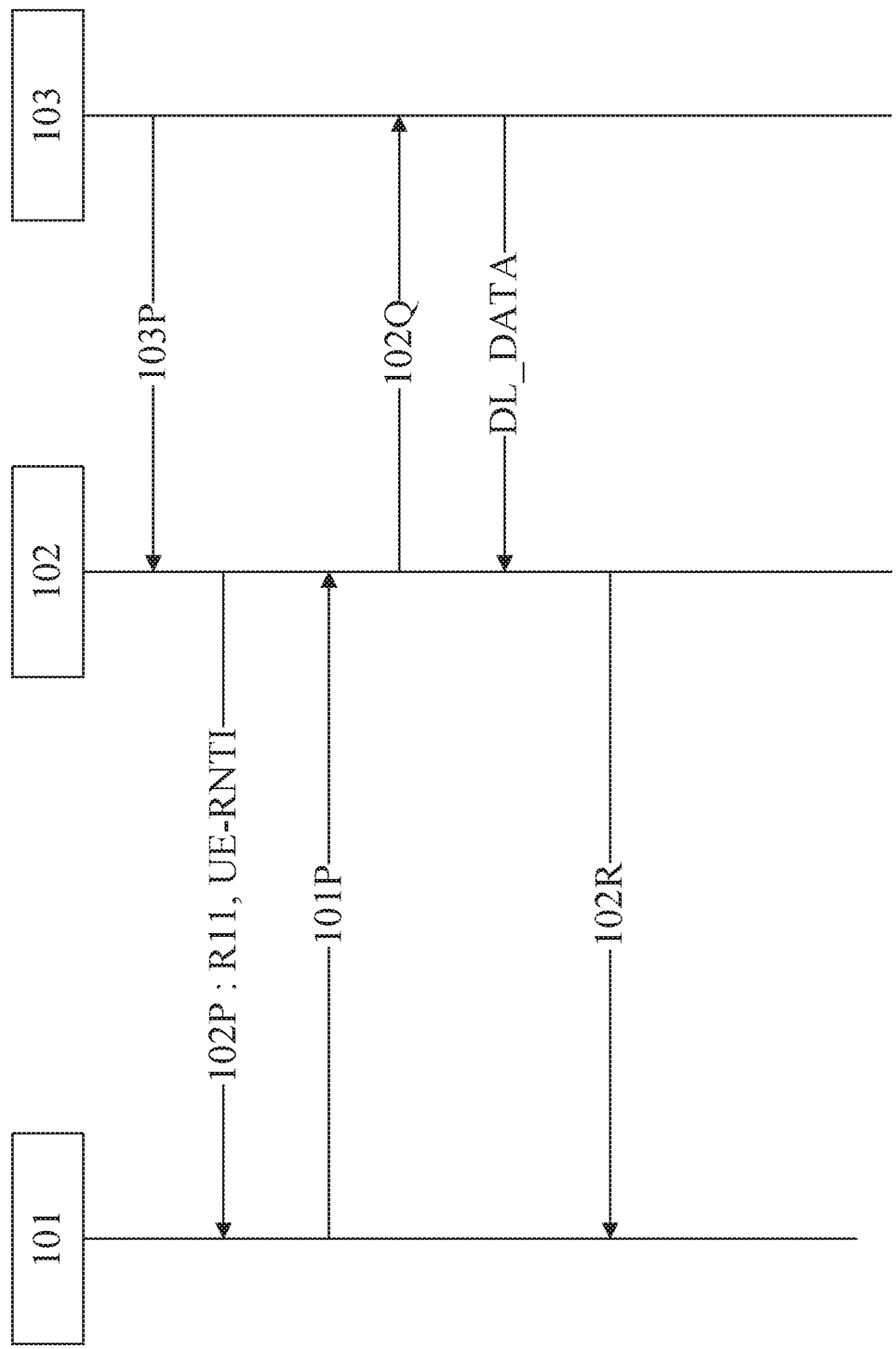
Figure 2D:
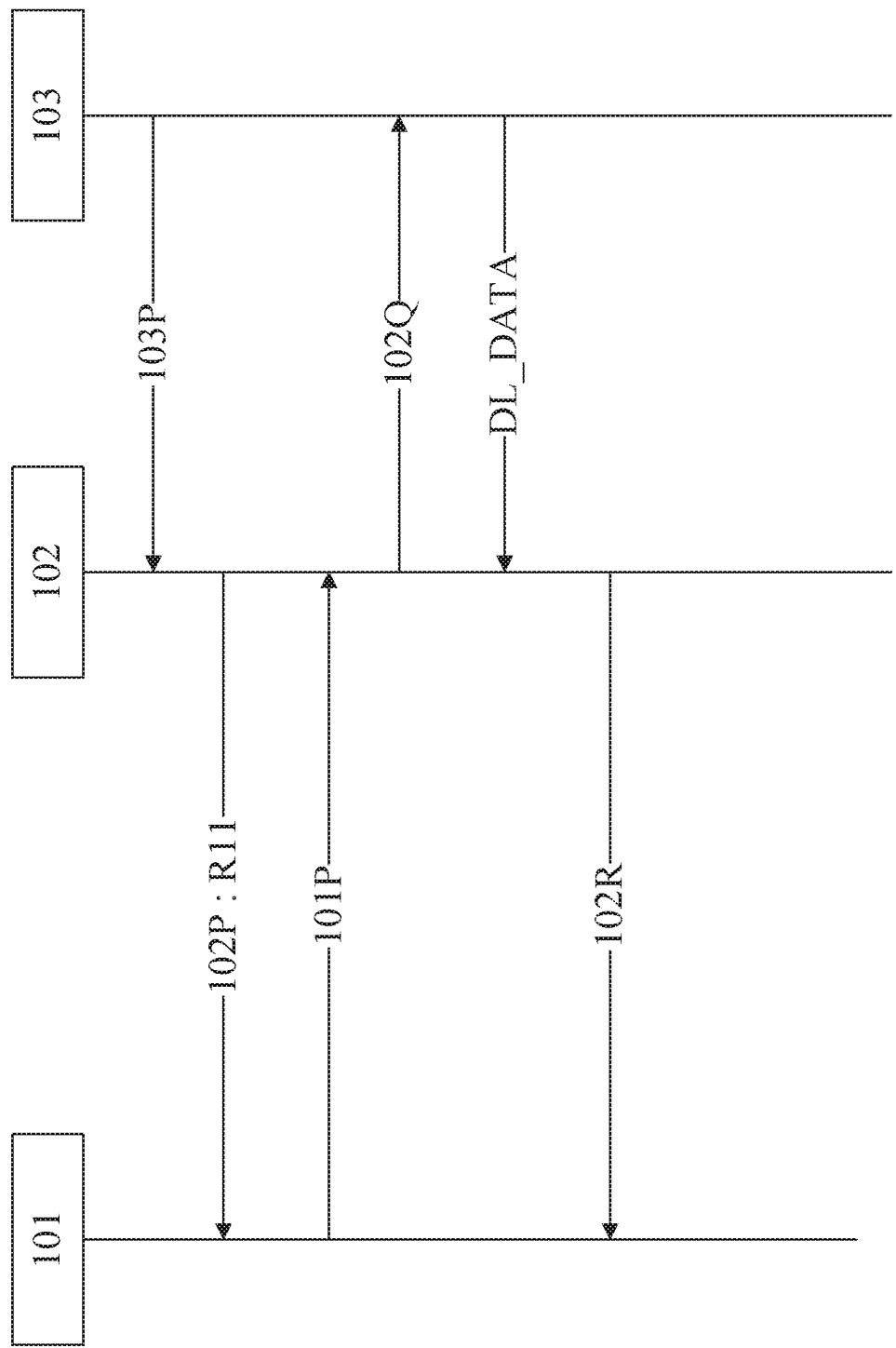

Please refer to FIGS. 2C and 2D. When CN 103 needs to initialize an Msg.2 based MT-EDT procedure with UE 101 via BS 102. CN 103 may transmit the paging message 103P to BS 102 first. After receiving the paging message 103P from CN 103, BS 102 may determine the RACH resource R11 for UE 101. In some embodiments, the RACH resource R11 may be dedicated to UE 101. In other words, the RACH resource R11 may be a contention-free resource for UE 101.

Then, BS 102 may transmit the paging message 102P including the RACH resource R11 to UE 101 for notifying UE 101 of the Msg.2 based MT-EDT procedure initialized by CN 103. In response to the RA preamble 101P from UE 101, BS 102 may transmit the RA response 102R to UE 101.

It should be appreciated that, before transmitting the RA response 102R, BS 102 may embed downlink data into the RA response 102R. In detail, after receiving the RA preamble 101P from UE 101, BS 102 may transmit a request 102Q to CN 103 for requesting downlink data for UE 101. Then, CN 103 may transmit downlink data DL_DATA to BS 102 in response to the request 102Q. After receiving the downlink data DL_DATA, BS 102 may embed the downlink data DL_DATA into a Medium Access Control (MAC) Protocol Data Unit (PDU) of the RA response 102R.

Next, BS 102 may scramble, by using a user equipment Radio Network Temporary Identity (RNTI) UE-RNTI, a Downlink Control Information (DCI) in a Physical Downlink Control Channel (PDCCH). The DCI may correspond to the MAC PDU of the RA response 102R. In some embodiments, BS 102 may scramble, by using the user equipment RNTI UE-RNTI, the DCI in the PDCCH corresponding to a user equipment specific search space. Then, BS 102 may transmit the RA response 102R to UE 101.

Next, after receiving the RA response 102R, UE 101 may descramble, by using the user equipment RNTI UE-RNTI, the DCI in the PDCCH for the MAC PDU of the response 102R. In some embodiments, UE 101 may descramble, by using the user equipment RNTI UE-RNTI, the DCI in the PDCCH corresponding to the user equipment specific search space for the MAC PDU of the response 102R. Then, UE 101 may obtain the downlink data DL_DATA from the MAC PDU of the response 102R.

In some embodiments, the RA response 102R which has DCI scrambled by UE-RNTI may be an RRC layer message. The RA response repetition number for the RA response 102R may be received in the paging message 102P or a SIB from BS 102. In some embodiments, the RA response repetition number may be same as a legacy RA response repetition number for an RA response which has DCI scrambled by RA-RNTI.

In some embodiments, the user equipment RNTI UE-RNTI may be included in the paging message 102P as shown in FIG. 2C so that UE 101 may use the user equipment RNTI UE-RNTI to descramble the DCI in the PDCCH for the MAC PDU of the RA response 102R. In some embodiments, the user equipment RNTI UE-RNTI may be a previous RNTI configured in a previous procedure connected to CN 103. More specifically, the previous RNTI may be configured during: (1) last Msg.2 based MT-EDT procedure; (2) last Msg.4 based MT-EDT procedure (which means downlink data is transmitted in Message 4 during RA procedure); (3) last MO-EDT procedure; or (4) normal RRC connection establishment/release procedure.

In some embodiments, the user equipment RNTI UE-RNTI may not have to be included in the paging message 102P as shown in FIG. 2D. Further, the user equipment RNTI may be calculated by UE 101 and BS 102 according to the following formula:

$$\text{UE-RNTI} = \text{UE-ID modulo maxRNTI}$$

where UE-RNTI represents the user equipment RNTI, UE-ID represents a user identity information. The UE-ID may be International Mobile Subscriber Identity (IMSI), or Temporary Mobile Subscriber Identity (TMSI), such as serving TIMS (S-TMSI). Parameter of maxRNTI represents a maximum value of RNTI configured by BS 102.

In some embodiments, the parameter of UE-ID may be transmitted in the paging message 102P or may be stored in UE 101 as the previous UE-ID used by UE 101. The parameter of maxRNTI may be a default value stored in UE 101 or be configured by BS 102. The UE-ID may be an identity associated to user equipment's IMSI, or TMSI (such as S-TMSI). UE-ID may be function associated to user equipment's IMSI or TMSI (such as S-TMSI). For example, UE-ID is truncated from user equipment's IMSI or user equipment's TMSI (such as S-TMSI). In addition. UE-ID is a combination of part user equipment's IMSI and part of user equipment's TMSI.

For preventing user equipment RNTI collision, in some embodiments, the user equipment RNTI may be calculated by UE 101 and BS 102 according to the following formula:

$$\text{UE-RNTI} = \text{UE-ID modulo maxRNTI} + \text{offset}$$

where UE-RNTI represents the user equipment RNTI, UE-ID represents the user identity information, maxRNTI represents the maximum value of RNTI configured by BS 102 and offset represents an offset value for the RACH resource R11.

In some embodiments, the offset may be a number associated to time resource and frequency resource of the RACH resource R11. In some embodiments, the offset may be a number associated to time resource, frequency resource and RA preamble resource of the RACH resource R11. In some embodiments, the offset may be a number associated to RA preamble resource of the RACH resource R11. In some embodiments, the offset may be a number associated to at least one of time resource, frequency resource and RA preamble resource of the RACH resource R11.

For example, the offset may be calculated as:

$$\text{offset} = 1 + t\_id + 10 * f\_id;$$

$$\text{offset} = 1 + t\_id + 10 * f\_id + 60 * (\text{SFN\_id modulo}(W\text{max}/10)); \text{ or}$$

$$\text{offset} = 1 + t\_id + 10 * f\_id + N * \text{preamble\_ID}$$

where t_id is an index of the first subframe of a specified PRACH ($0 \leq t\_id < 10$), f_id is an index of the specified PRACH within that subframe, in ascending order of frequency domain ($0 \leq f\_id < 6$), SFN_id is the index of the first radio frame of the specified PRACH. Wmax is the maximum possible RA response window size in subframes for user equipment with bandwidth reduced low complexity or user equipment in enhanced coverage, N is a nature number, and preamble_ID may be preamble index information. For example, preamble_ID may be configured as one number from M to 63. M is zero or a nature number.

In some embodiments, user equipment RNTI may be a number associated to time resource and frequency resource of the RACH resource R11. In some embodiments, user equipment RNTI may be a number associated to time resource, frequency resource and RA preamble resource of the RACH resource R11. In some embodiments, user equipment RNTI may be a number associated to RA preamble resource of the RACH resource R11. In some embodiments, user equipment RNTI may be a number associated to at least one of time resource, frequency resource and RA preamble resource of the RACH resource R11.

In some embodiments, user equipment UE-RNTI may be calculated as:

$$UE\text{-}RNTI = 1 + t\_id + 10 * f\_id + N * preamble\_ID; \text{ or}$$

$$UE\text{-}RNTI = 1 + t\_id + 10 * f\_id + 60 * (SFN\_id \text{ modulo } (Wmax/10)) + N * preamble\_ID$$

where t_id is an index of the first subframe of a specified PRACH ($0 \le t\_id < 10$), f_id is an index of the specified PRACH within that subframe, in ascending order of frequency domain ($0 \le f\_id < 6$). SFN_id is the index of the first radio frame of the specified PRACH, Wmax is the maximum possible RA response window size in subframes for user equipment with bandwidth reduced low complexity or user equipment in enhanced coverage. N is a nature number, and preamble_ID may be preamble index information. For example, preamble_ID may be configured as one number from M to 63. M is zero or a nature number.

In some embodiments. BS 102 may embed uplink grant information and timing advance information in MAC control element of the MAC PDU of the RA response 102R. Accordingly, UE 101 may obtain the uplink grant information and the timing advance information in MAC control element of the MAC PDU of the RA response 102R. In some embodiments, DCI may include a Physical Uplink Control Channel (PUCCH) information for UE 101 to report feedback of acknowledge or non-acknowledge for the downlink data DL_DATA.

In some embodiments, as for user plane, after receiving the downlink data DL_DATA, BS 102 may embed the downlink data DL_DATA into a MAC Service Data Unit (SDU) in information, which is dedicated to UE 101, of the RA response 102R. Then, after receiving the RA response 102R, UE 101 may obtain the downlink data DL_DATA from the MAC SDU in the information, which is dedicated to UE 101, of the RA response 102R. In some embodiments, the downlink data DL_DATA from the MAC SDU is embedded at an end of the information, which is dedicated to UE 101, of the RA response 102R.

In some embodiments, an uplink grant for PUCCH resource of acknowledgement or non-acknowledgement for the downlink data DL_DATA may be embedded with a legacy uplink grant information of a MAC control element of the MAC SDU in the information, which is dedicated to UE 101, of the RA response 102R. In some embodiments, the downlink grant for PUCCH of acknowledgement or non-acknowledgement for the downlink data DL_DATA may be embedded between a temporary Cell-Radio Network Temporary Identity (C-RNTI) and downlink data of MAC control element of the MAC SDU in the information, which is dedicated to UE 101, of the RA response 102R.

In some embodiments, as for control plane, after receiving the downlink data DL_DATA, BS 102 may embed the downlink data DL_DATA in front of a Non-Access-Stratum (NAS) PDU in the information, which is dedicated to UE 101, of the RA response 102R. Then, after receiving the RA response 102R, UE 101 may obtain the downlink data DL_DATA from the NAS PDU in the information, which is dedicated to UE 101, of the RA response 102R. In some embodiments, the downlink data DL_DATA from the NAS PDU is embedded at an end of the information, which is dedicated to UE 101, of the RA response 102R.

In some embodiments, an uplink grant for PUCCH resource of acknowledgement or non-acknowledgement for the downlink data DL_DATA may be embedded with legacy uplink grant information of a MAC control element of the NAS PDU of the RA response 102R. In some embodiments, the downlink grant for PUCCH of acknowledgement or non-acknowledgement for the downlink data DL_DATA may be embedded between a temporary Cell-Radio Network Temporary Identity (C-RNTI) and downlink data of MAC control element of the NAS PDU of the RA response 102R.

In some embodiments, a DCI, which corresponds to NAS PDU in the RA response 102R, in a PDCCH may be scramble by using an RA-RNTI. In some embodiments, the DCI, which corresponds to NAS PDU in the RA response 102R, in the PDCCH corresponding to a common search space may be scramble by using the RA-RNTI.

In some embodiments, the downlink grant may further include scheduling information for repeated PDCCH or Physical Downlink Share Channel (PDSCH) for downlink data in Msg.2 based MT-EDT procedure.

In some embodiments, the downlink grant may be embedded with legacy uplink grant information of a MAC control element of the NAS PDU of the RA response 102R. In some embodiments, the downlink grant may be embedded between a temporary Cell-Radio Network Temporary Identity (C-RNTI) and downlink data of MAC control element of the NAS PDU of the RA response 102R.

In some embodiments, a subhead for user equipment specific RA response may include an indication indicating that user equipment specific RA response is for MT-EDT procedure.

In some embodiments, CN 103 and BS 102 may be included in a Self-Organizing Network (SON). When BS 102 needs feedback of some information from UE 101 to facilitate SON, BS 102 may indicate UE 101 to change to Radio Resource Control (RRC) connected mode by an indication in an RA response (i.e., Message 2 of MT-EDT procedure) or by an RRC message. Then, UE 101 may transmit information to BS 102.

Figure 3:
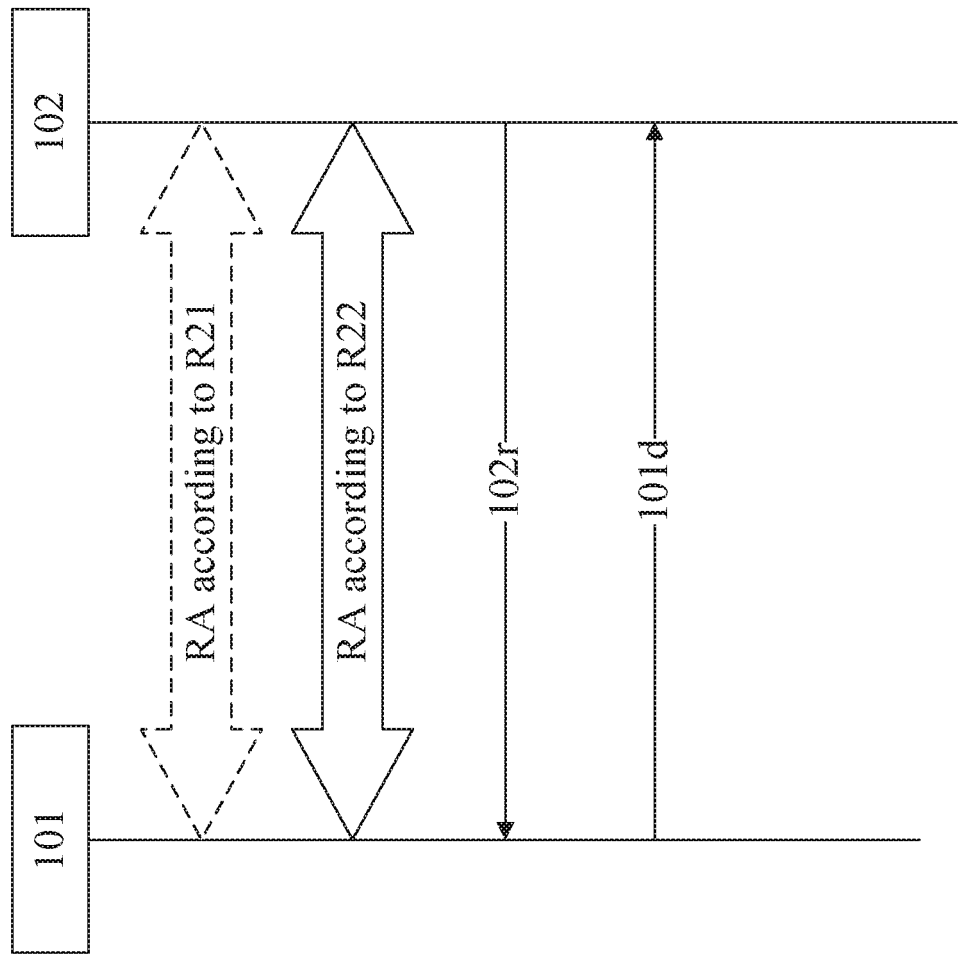
FIG. 3 is a schematic view of message transmission among a wireless communication system according to an embodiment of the present disclosure.

In some embodiments, the information for facilitating SON may include an indicator indicating that UE 101 accesses BS 102 over multiple RACH resources. Referring to FIG. 3, more specifically, UE 101 may perform RA procedure to access BS 102 according to a RACH resource R21. Then, UE 101 may fail to access BS 102 according to the RACH resource R21 (i.e., fail to access BS 102 as the dot line in FIG. 3). Therefore, UE 101 may request to access BS 102 according to a RACH resource R22 which is different from the RACH resource R21.

After successfully accessing to BS 102 according to the RACH resource R22, UE 101 may receive an information request 102r from BS 102. The information request 102r may include an RACH information request (not shown). Then. UE 101 may transmit an indication 101d to BS 102 in response to the RACH information request. The indication 101d indicates that UE 101 accesses BS 102 over multiple RACH resources. In other words, the indication 101d indicates that UE 101 accesses BS 102 according to the RACH resource R22 instead of the RACH resource R21.

For example, the RACH resource R21 is configured as Message 2 RACH resource, and the RACH resource R22 is configured as regular RA resource. In other words, the RACH resource R21 is dedicated to utilization of Message 2 of MT-EDT, and the RACH resource R22 is dedicated to utilization of regular RA. Accordingly, the indication indicates that UE 101 accessed BS 102 from Msg.2 based MT-EDT procedure fallbacks to regular RA procedure.

For example, the RACH resource R21 is configured as Message 2 RACH resource, and the RACH resource R22 is configured as MO-EDT RACH resource. In other words, the RACH resource R21 is dedicated to utilization of Message 2 of MT-EDT, and the RACH resource R22 is dedicated to utilization of MO-EDT. Accordingly, the indication indicates that UE 101 accessed BS 102 from Msg.2 based MT-EDT procedure fallbacks to MO-EDT procedure.

For example, the RACH resource R21 is configured as Message 4 (i.e., Message 4 of EDT) RACH resource, and the RACH resource R22 is configured as MO-EDT RACH resource. In other words, the RACH resource R21 is dedicated to utilization of Message 4 of EDT, and the RACH resource R22 is dedicated to utilization of MO-EDT. Accordingly, the indication indicates that UE 101 accessed BS 102 from Message 4 based MT-EDT procedure fallbacks to MO-EDT procedure.

For example, the RACH resource R21 is configured as Message 4 RACH resource, and the RACH resource R22 is configured as regular RA resource. In other words, the RACH resource R21 is dedicated to utilization of Message 4 based MT-EDT, and the RACH resource R22 is dedicated to utilization of regular RA. Accordingly, the indication indicates that UE 101 accessed BS 102 from Message 4 based MT-EDT procedure to regular RA procedure.

For example, the RACH resource R21 is configured as MT-EDT RACH resource, and the RACH resource R22 is configured as MO-EDT RACH resource. In other words, the RACH resource R21 is dedicated to utilization of MT-EDT, and the RACH resource R22 is dedicated to utilization of MO-EDT. Accordingly, the indication indicates that UE 101 accessed BS 102 from MT-EDT procedure to MO-EDT procedure.

For example, the RACH resource R21 is configured as MT-EDT RACH resource, and the RACH resource R22 is configured as regular RA resource. In other words, the RACH resource R21 is dedicated to utilization of MT-EDT, and the RACH resource R22 is dedicated to utilization of regular RA. Accordingly, the indication indicates that UE 101 accessed BS 102 from MT-EDT procedure to regular RA procedure.

In some embodiments, the indication may be included in a RRC request (i.e., Message 3 of EDT procedure) in response to an RA response from BS 102. In some embodiments, the indication may be included in an RRC complete message (i.e., Message 5 of EDT procedure) in response to an RRC response from BS 102.

Figure 4:
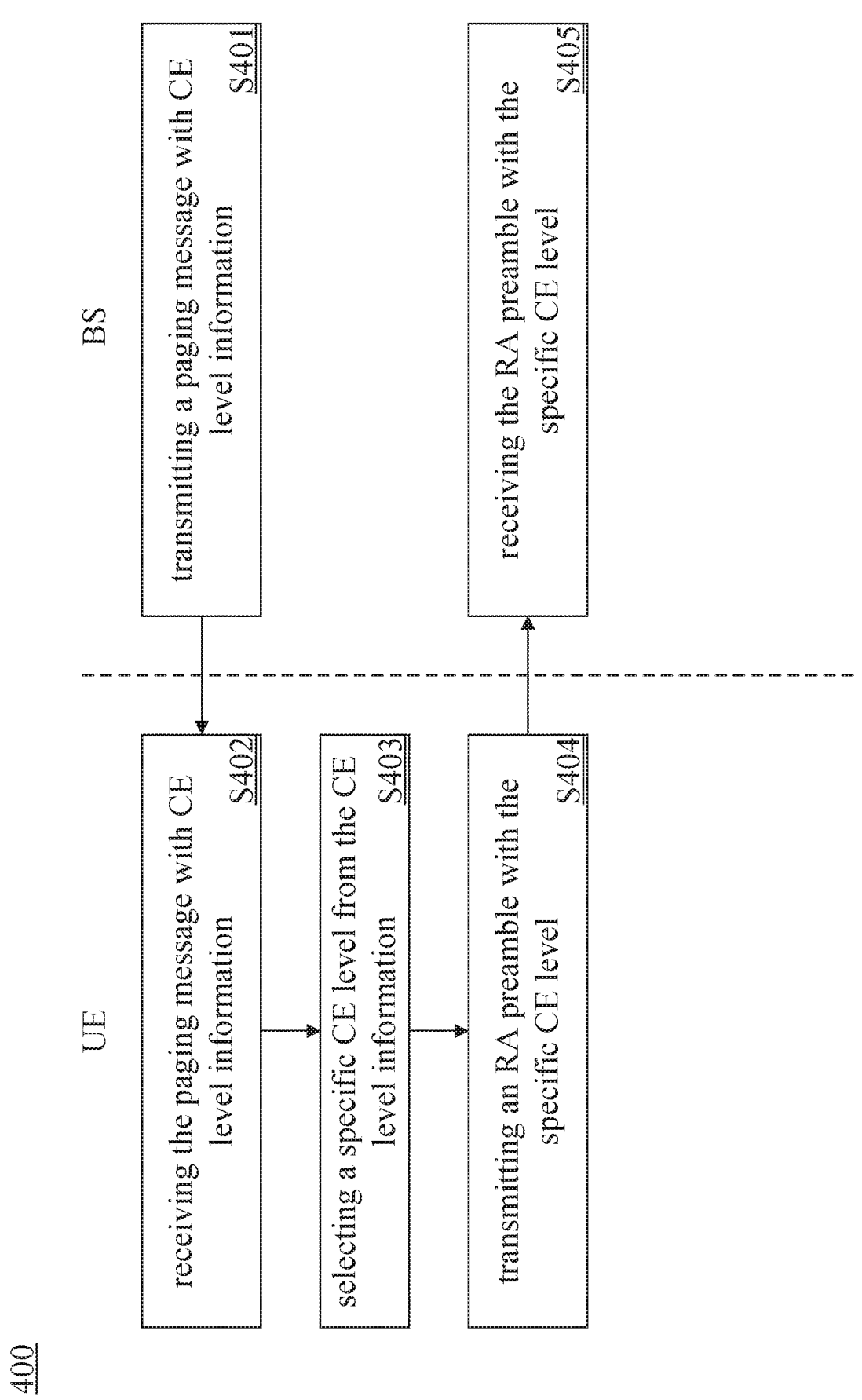
FIG. 4 illustrates a flow chart of a method for wireless communications according to an embodiment of the present disclosure.

FIG. 4 illustrates a flow chart of a method for wireless communications in accordance with some embodiments of the present application. Referring to FIG. 4, method 400 is performed by a UE (e.g., UE 101) and a BS (e.g., BS 102) in some embodiments of the present application.

Operation S401 is executed to transmit, by BS, a paging message to UE. The paging message may include a RACH resource and CE level information associated with the RACH resource. Operation S402 is executed to receive, by UE, the paging message form BS. Operation S403 is executed to select, by UE, a specific CE level from the CE level information. In response to the paging message, operation S404 is executed to transmit, by U E, an RA preamble to BS according to the RACH resource with the specific CE level. Operation S405 is executed to receive, by BS, the RA preamble from UE.

In some embodiments, the CE level information may include a first CE level and a second CE level. The first CE level may be the same as a CE level of UE stored in a MME or stored in BS. The second CE level may be a CE level higher than the first CE level or the second CE level may be a highest CE level. In some embodiments, the CE level information may further include a third CE level. The third CE level may be a CE level lower than the first CE level or the third CE level may be the lowest CE level.

In some embodiment, the specific CE level may be selected as the same as a CE level currently used by UE. In some embodiments, the specific CE level may be selected as a CE level higher than the CE level currently used by UE. In some embodiments, the specific CE level may be selected as a CE level lower than the CE level currently used by UE. In some embodiments, the specific CE level may be selected as the highest CE level. In some embodiments, the specific CE level may be selected as the lowest CE level.

Figure 5A:
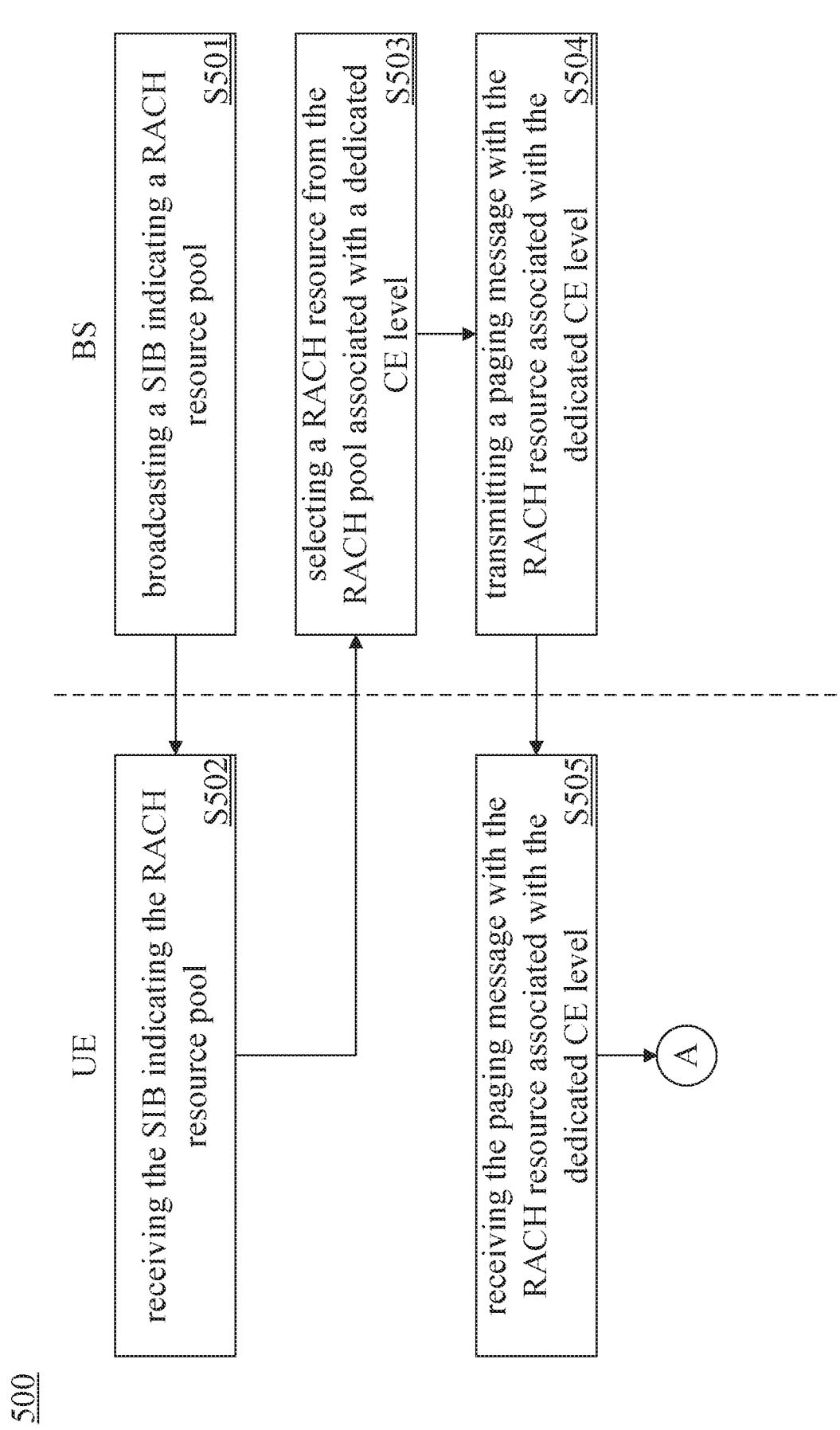
FIGS. 5A to 5B illustrate flow charts of a method for wireless communications according to an embodiment of the present disclosure.
Figure 5B:
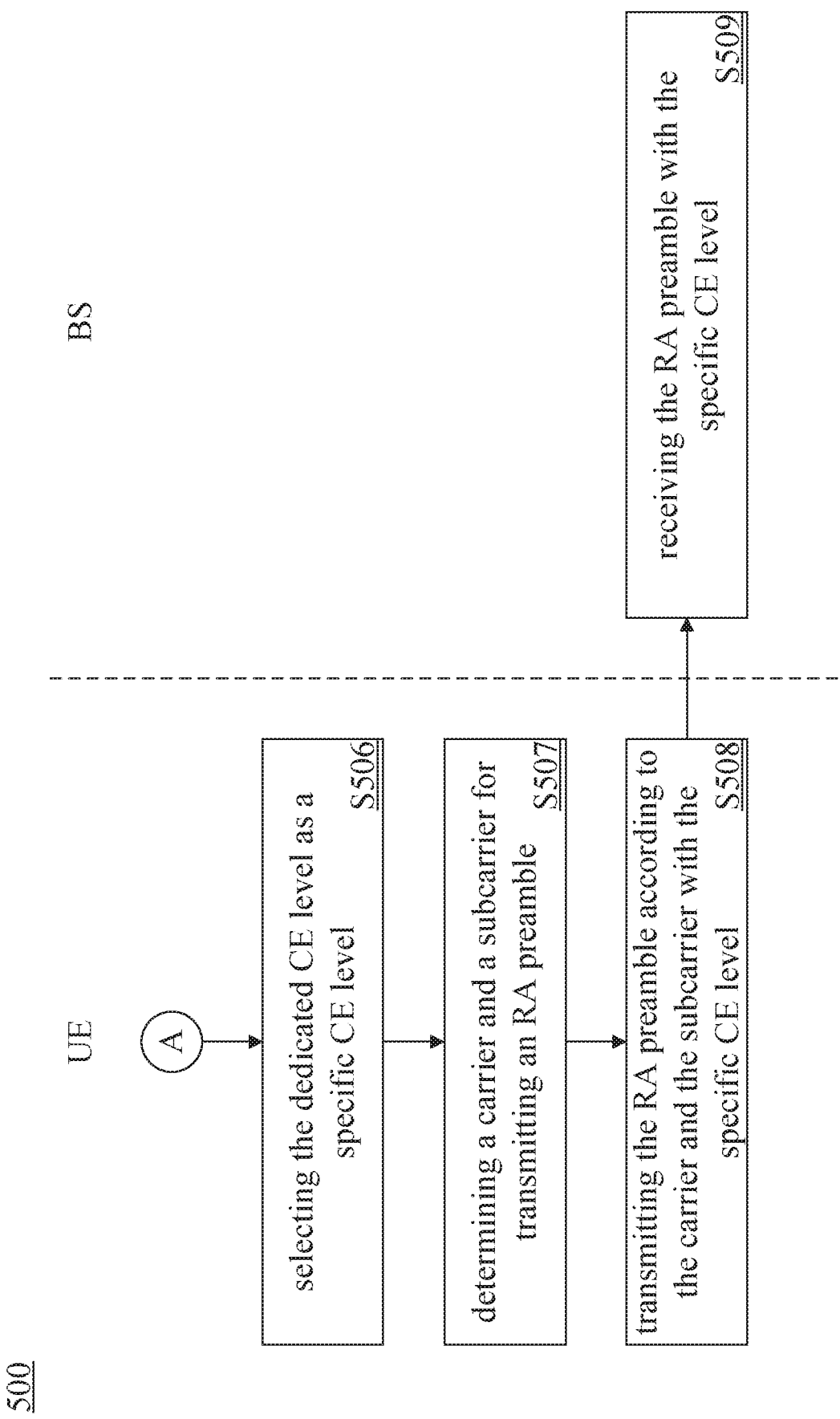

FIGS. 5A to 5B illustrate flow charts of a method for wireless communications in accordance with some embodiments of the present application. Referring to FIGS. 5A to 5B, method 500 is performed by a UE (e.g., UE 101) and a BS (e.g., BS 102) in some embodiments of the present application.

Operation S501 is executed to broadcast, by BS, a SIB. The SIB may indicate a RACH resource pool associated with a dedicated CE level. Operation S502 is executed to receive, by UE, the SIB. Operation S503 is executed to select, by BS, a RACH resource from the RACH resource pool. Operation S504 is executed to transmit, by BS, a paging message to UE. The paging message includes the selected RACH resource associated with the dedicated CE level. Operation S505 is executed to receive, by UE, the paging message from BS.

Operation S506 is executed to select, by UE, the dedicated CE level as a specific CE level. Operation S507 is executed to determine, by UE, a carrier and a subcarrier for transmitting an RA preamble. In response to the paging message, operation S508 is executed to transmit, by UE, the RA preamble according to the carrier and the subcarrier with the specific CE level. Operation S509 is executed to receive, by BS, the RA preamble with the specific CE level from UE.

Figure 6:
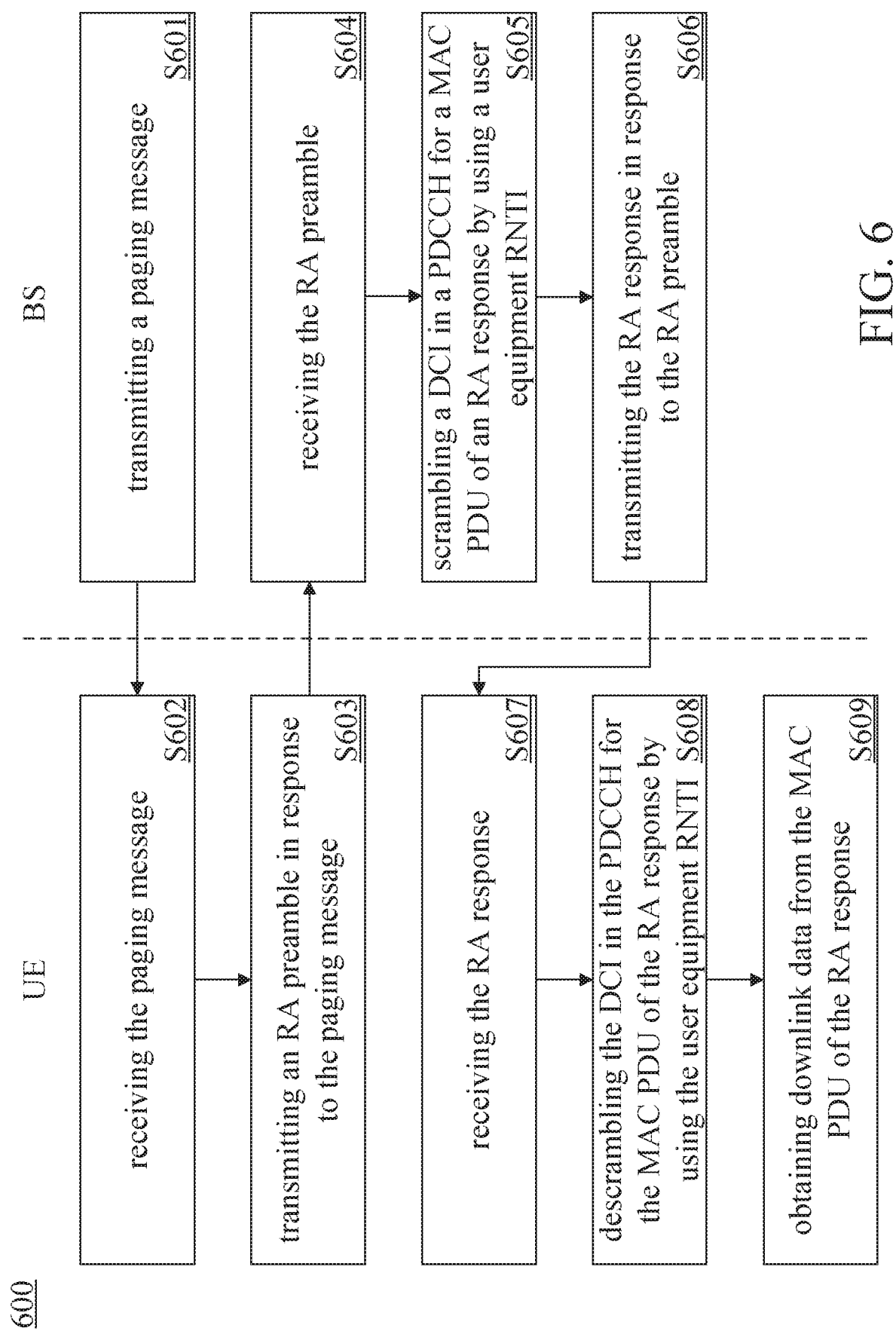
FIG. 6 illustrates a flow chart of a method for wireless communications according to an embodiment of the present disclosure.

FIG. 6 illustrates a flow chart of a method for wireless communications in accordance with some embodiments of the present application. Referring to FIG. 6, method 600 is performed by a UE (e.g., UE 101) and a BS (e.g., BS 102) in some embodiments of the present application.

Operation S601 is executed to transmit, by BS, a paging message to UE. Operation S602 is executed to receive, by UE, the paging message from the BS. Operation S603 is executed to transmit, by UE, an RA preamble to BS in response to the paging message. Operation S604 is executed to receive, by BS, the RA preamble from UE.

Operation S605 is executed to scramble, by BS, a DCI in a PDCCH for a MAC PDU of an RA response by using a user equipment RNTI. Downlink data may be embedded in the MAC PDU of the RA response. In response to the RA preamble, operation S606 is executed to transmit, by BS, the RA response to UE. Operation S607 is executed to receive, by UE, the RA response from BS.

Operation S608 is executed to descramble, by UE, the DCI in PDCCH for the MAC PDU of the RA response by using the user equipment RNTI. Operation S609 is executed to obtain, by UE, the downlink data from the MAC PDU of the RA response.

Figure 7A:
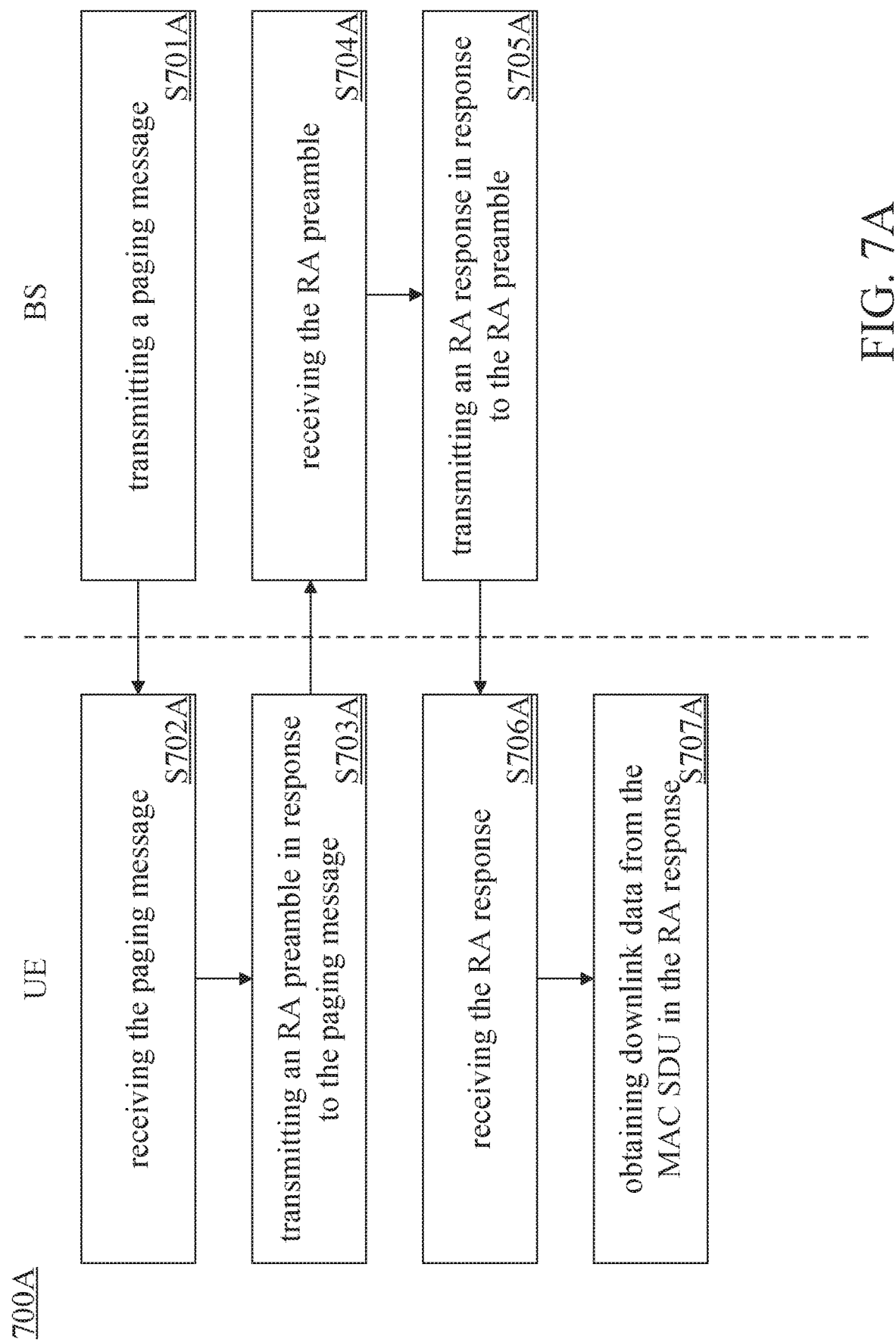
FIG. 7A illustrates a flow chart of a method for wireless communications according to an embodiment of the present disclosure.

FIG. 7A illustrates a flow chart of a method for wireless communications in accordance with some embodiments of the present application. Referring to FIG. 7A, method 700A is performed by a UE (e.g., UE 101) and a BS (e.g., BS 102) in some embodiments of the present application.

Operation S701A is executed to transmit, by BS, a paging message to UE. Operation S702A is executed to receive, by UE, the paging message from the BS. Operation S703A is executed to transmit, by UE, an RA preamble to BS in response to the paging message. Operation S704A is executed to receive, by BS, the RA preamble from UE.

In response to the preamble, operation S705A is executed to transmit, by BS, an RA response to UE. As for user plane, downlink data may be embedded in a MAC SDU in information, which is dedicated to the user equipment, of the RA response. Operation S706A is executed to receive, by UE, the RA response from BS. Operation S707A is executed to obtain, by UE, the downlink data from the MAC SDU in the information, which is dedicated to the user equipment, of the RA response.

Figure 7B:
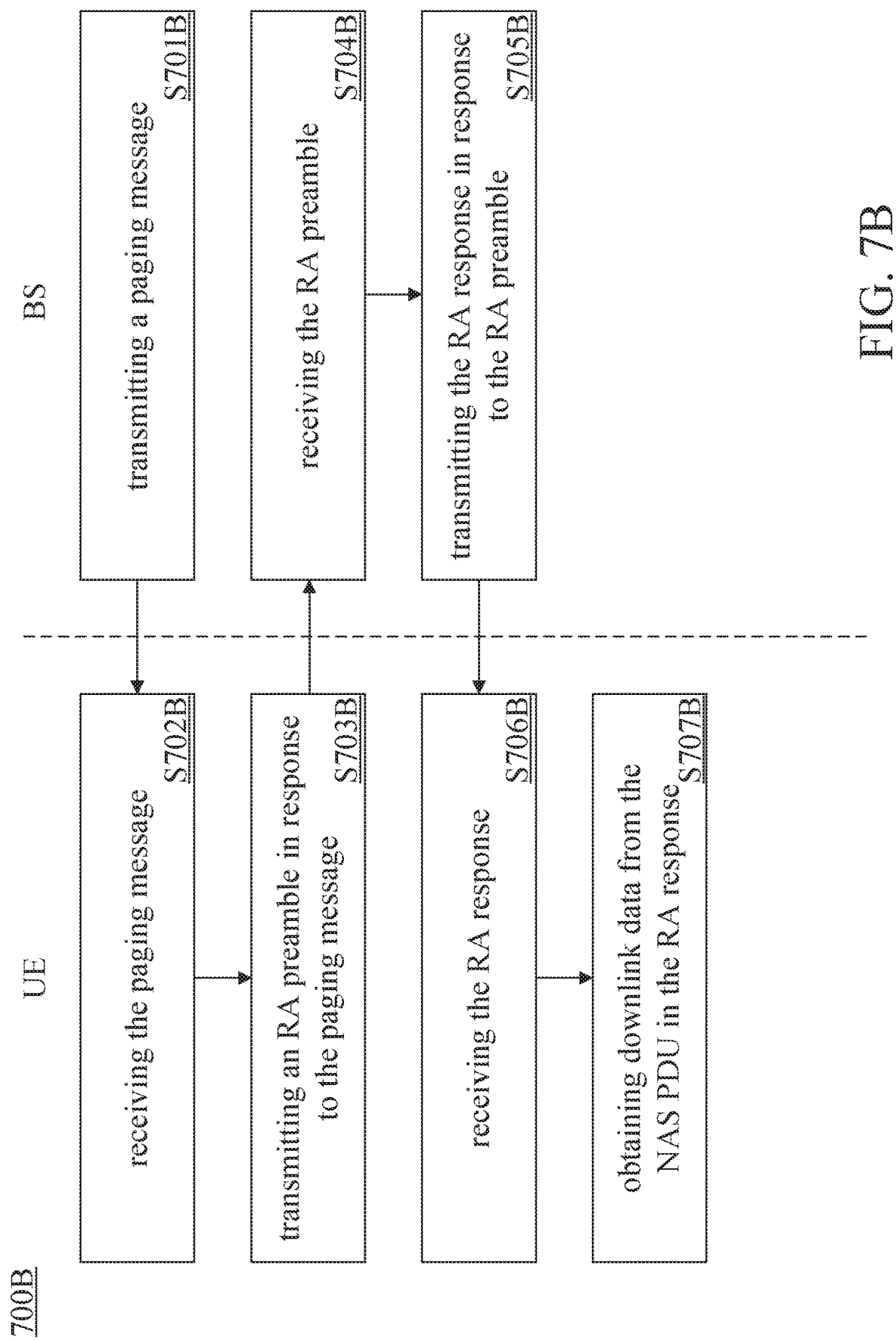
FIG. 7B illustrates a flow chart of a method for wireless communications according to an embodiment of the present disclosure.

FIG. 7B illustrates a flow chart of a method for wireless communications in accordance with some embodiments of the present application. Referring to FIG. 7B, method 700B is performed by a UE (e.g., UE 101) and a BS (e.g., BS 102) in some embodiments of the present application.

Operation S701B is executed to transmit, by BS, a paging message to UE. Operation S702B is executed to receive, by UE, the paging message from the BS. Operation S703B is executed to transmit, by UE, an RA preamble to BS in response to the paging message. Operation S704B is executed to receive, by BS, the RA preamble from UE.

In response to the preamble, operation S705B is executed to transmit, by BS, an RA response to UJE. As for control plane, downlink data may be embedded in a NAS PDU in information, which is dedicated to the user equipment, of the RA response. Operation S706B is executed to receive, by UE, the RA response from BS. Operation S707A is executed to obtain, by UE, the downlink data from the NAS PDU in the information, which is dedicated to the user equipment, of the RA response.

Figure 8:
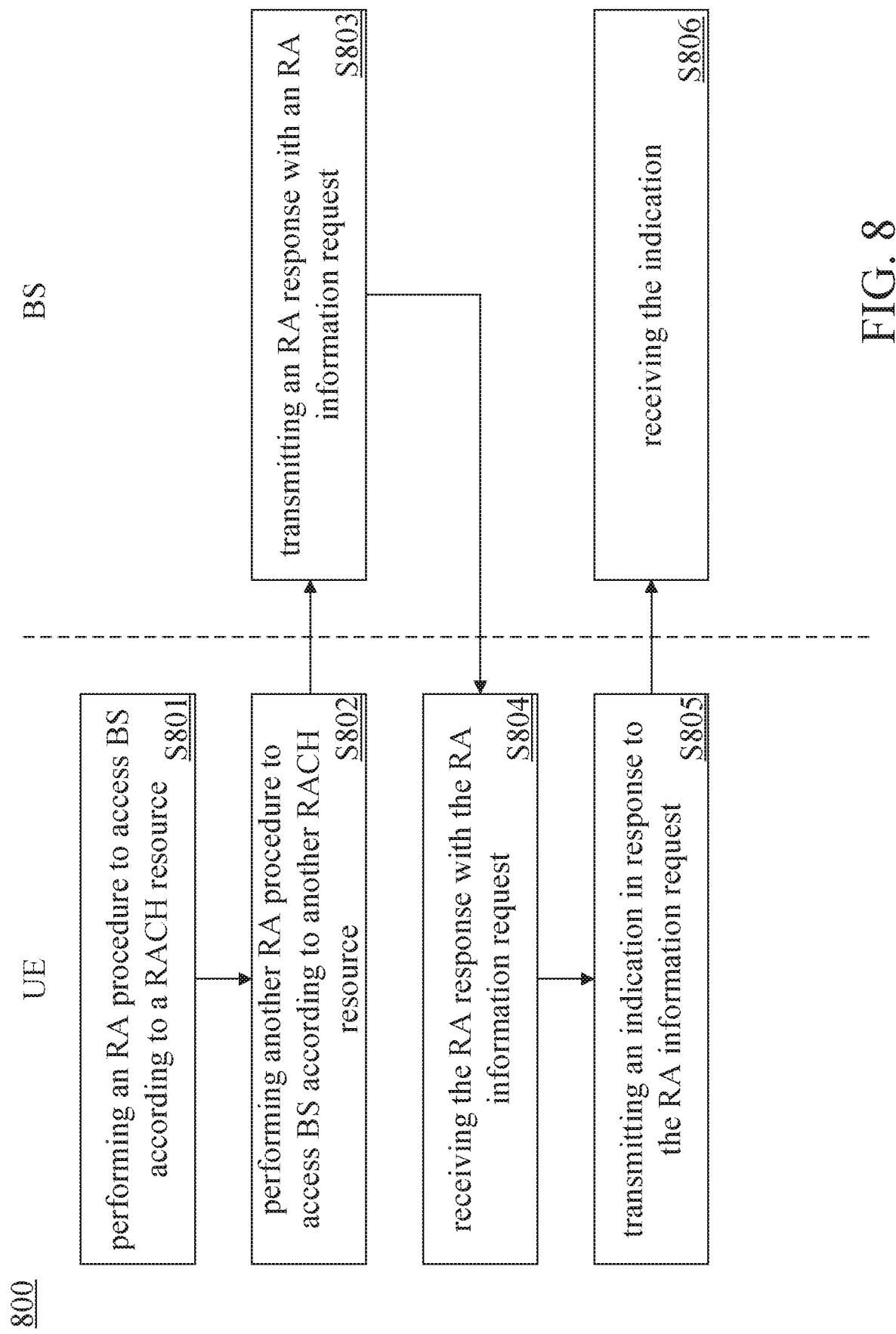
FIG. 8 illustrates a flow chart of a method for wireless communications according to an embodiment of the present disclosure.

FIG. 8 illustrates a flow chart of a method for wireless communications in accordance with some embodiments of the present application. Referring to FIG. 8, method 800 is performed by a UE (e.g., UE 101) and a BS (e.g., BS 102) in some embodiments of the present application.

Operation S801 is executed to perform, by UE, an RA procedure to access BS according to an RACH resource. When the RA procedure fails, operation S802 is executed to perform, by UE, another RA procedure to access BS according to another RACH resource. The another RACH resource may be different from the RACH resource.

When the another RA procedure successes, operation S803 is executed to transmit, by BS, an RA response to UE. The RA response may include an RA information request. Operation S804 is executed to receive, by UE, the RA response with the RA information request from BS. Operation S805 is executed to transmit, by UE, an indication to BS in response to the RA information request. The indication indicates that UE accessed BS over multiple RACH resources. Operation S806 is executed to receive, by BS, the indication from UE.

Figure 9:
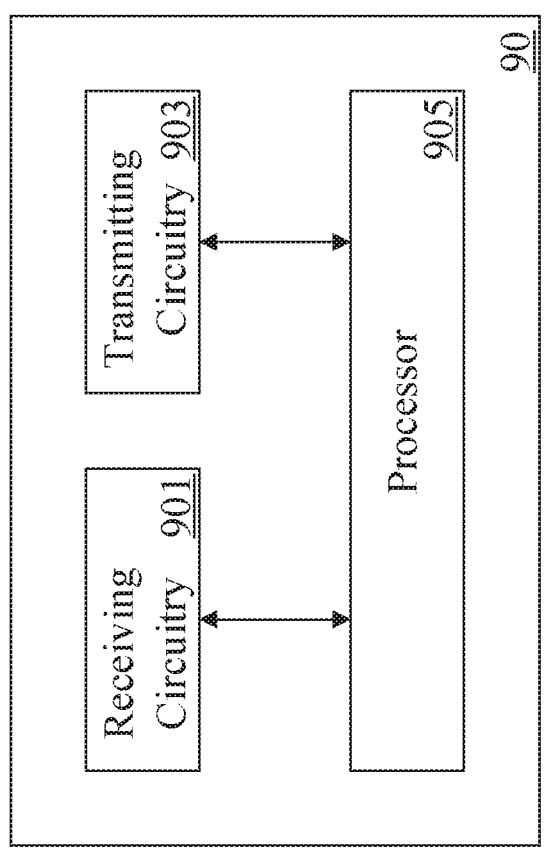
FIG. 9 illustrates an example block diagram of an apparatus according to an embodiment of the present disclosure.

FIG. 9 illustrates an example block diagram of an apparatus 90 according to an embodiment of the present disclosure.

As shown in FIG. 9, the apparatus 90 may include at least one non-transitory computer-readable medium (not illustrated in FIG. 9), a receiving circuitry 901, a transmitting circuitry 903, and a processor 905 coupled to the non-transitory computer-readable medium (not illustrated in FIG. 9), the receiving circuitry 901 and the transmitting circuitry 903. The apparatus 90 may be a base station or a user equipment.

Although in this figure, elements such as processor 905, transmitting circuitry 903, and receiving circuitry 901 are described in the singular, the plural is contemplated unless limitation to the singular is explicitly stated. In some embodiments of the present disclosure, the receiving circuitry 901 and the transmitting circuitry 903 are combined into a single device, such as a transceiver. In certain embodiments of the present disclosure, the apparatus 90 may further include an input device, a memory, and/or other components.

In some embodiments of the present disclosure, the non-transitory computer-readable medium may have stored thereon computer-executable instructions to cause a processor to implement the method with respect to the base station as described above. For example, the computer-executable instructions, when executed, cause the processor 905 interacting with receiving circuitry 901 and transmitting circuitry 903, so as to perform the operations with respect to BS depicted in FIG. 1.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 90 interacting with receiving circuitry 901 and transmitting circuitry 903, so as to perform the operations with respect to UE depicted in FIG. 1.

Those having ordinary skill in the art would understand that the operations of a method described in connection with the aspects disclosed herein may be embodied directly in hardware, in a software module executed by a processor, or in a combination of the two. A software module may reside in RAM memory, flash memory. ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

We claim:

1. A method of a user equipment (UE), the method comprising:
   receiving a single transmission of a paging message from a base station, wherein the single transmission of the paging message comprises, within the paging message, a random access channel (RACH) resource information and a plurality of coverage enhancement (CE) levels for transmission of a random access (RA) preamble from the UE to the base station;
   selecting a specific CE level from the plurality of CE levels of the single transmission of the paging message; and
   transmitting the random access (RA) preamble to the base station according to the RACH resource information according to the specific CE level.

2. The method of claim 1, wherein the specific CE level is the same as a CE level currently used by the user equipment, or the specific CE level is higher than the CE level currently used by the user equipment.

3. The method of claim 1, wherein the plurality of CE levels are defined by a plurality of RA preamble repetition numbers, and the plurality of RA preamble repetition numbers are included in the paging message or a system information block (SIB) broadcasted by the base station.

4. The method of claim 1, wherein the plurality of CE levels comprise a first CE level and a second CE level, the first CE level is the same as a CE level of the user equipment stored in a mobility management entity (MME) or stored in the base station, and the second CE level is a CE level higher than the first CE level or the second CE level is a highest CE level.

5. The method of claim 4, wherein the plurality of CE levels further comprise a third CE level, and the third CE level is a CE level lower than the first CE level or the third CE level is the lowest CE level.

6. The method of claim 1, wherein the plurality of CE levels comprise a highest CE level.

7. The method of claim 1, wherein the plurality of CE levels information comprise CE levels 0 to 3 defined in narrowband internet of things (NB-IoT) network or comprises CE levels 0 to 2 defined in enhanced machine type communication (eMTC).

8. The method of claim 1, wherein the paging message further comprises at least one RA response repetition number from the base station, and the at least one RA response repetition number corresponds to at least one CE level of the plurality of CE levels.

9. The method of claim 1, wherein the RACH resource is selected from a RACH resource pool associated with the specific CE level and the RACH resource pool is for the user equipment to initialize an RA procedure by sending the RA preamble in the RACH resource and receiving downlink data in an RA response from the base station.

10. The method of claim 9, further comprising:
    receiving a SIB broadcasted from the base station, wherein the RACH resource pool is indicated in the SIB.

11. The method of claim 10, further comprising:
    determining a carrier and a subcarrier for transmitting the preamble.

12. The method of claim 11, wherein determining the subcarrier further comprises:
    determining the subcarrier according to a dedicated subcarrier index configured by the base station.

13. The method of claim 11, wherein determining the subcarrier further comprises:
    calculating a subcarrier index according to the following formula:
    SI-(ra-PreambleIndex) modulo (nprach-NumSubcarriersForMsg2MT-EDT),
    wherein SI represents the subcarrier index, ra-PreambleIndex represents a configured random access preamble index and nprach-NumSubcarriersForMsg2MT-EDT represents a subcarrier number for transmitting the random access preamble, and ra-PreambleIndex are pre-configured by the base station in the paging message or in the SIB; and nprach-NumSubcarriersForMsg2MT-EDT are pre-configured by the base station in the paging message or in the SIB; and
    determining the subcarrier according to the subcarrier index.

14. The method of claim 1, further comprising:
    determining a CE level currently used by the user equipment is changed; and
    transmitting the CE level currently used by the user equipment to the base station in response to the change.

15. The method of claim 1, further comprising:
    transmitting a CE level currently used by the user equipment to the base station when a timer expires.

16. A base station, comprising:
    at least one memory; and
    at least one processor coupled with the at least one memory and configured to cause the base station to:
       transmit a single transmission of a paging message to a user equipment (UE), wherein the single transmission of the paging message comprises a RACH resource information and a plurality of coverage enhancement (CE) levels for the UE to select a specific CE level from the plurality of CE levels of the single transmission of the paging message for transmission of a random access (RA) preamble from the UE to the base station; and
       receive the random access (RA) preamble from the UE according to the RACH resource information with the specific CE level.

17. The base station of claim 16, wherein the specific CE level is the same as a CE level currently used by the UE, or the specific CE level is higher than the CE level currently used by the UE.

18. The base station of claim 16, wherein the plurality of CE levels are defined by a plurality of RA preamble repetition numbers, and the plurality of RA preamble repetition numbers are included in the paging message or a system information block (SIB) broadcasted by the base station.

19. The base station of claim 16, wherein the plurality of CE levels comprise a first CE level and a second CE level, the first CE level is the same as a CE level of the user equipment stored in a MME or stored in the base station, and the second CE level is a CE level higher than the first CE level or the second CE level is a highest CE level.

20. A user equipment (UE), comprising:
at least one memory; and
at least one processor coupled with the at least one memory and configured to cause the UE to:
receive a single transmission of a paging message from a base station, wherein the single transmission of the paging message comprises a random access channel (RACH) resource information and a plurality of coverage enhancement (CE) levels for transmission of a random access (RA) preamble from the UE to the base station;
select a specific CE level from the plurality of CE levels of the single transmission of the paging message; and
transmit the random access (RA) preamble to the base station according to the RACH resource information according to the specific CE level.

* * * * *